May 5, 1964    B. B. MATHIAS    3,131,815
INSPECTING SEALED CONTAINERS FOR VACUUM
Filed Dec. 29, 1960    7 Sheets-Sheet 1
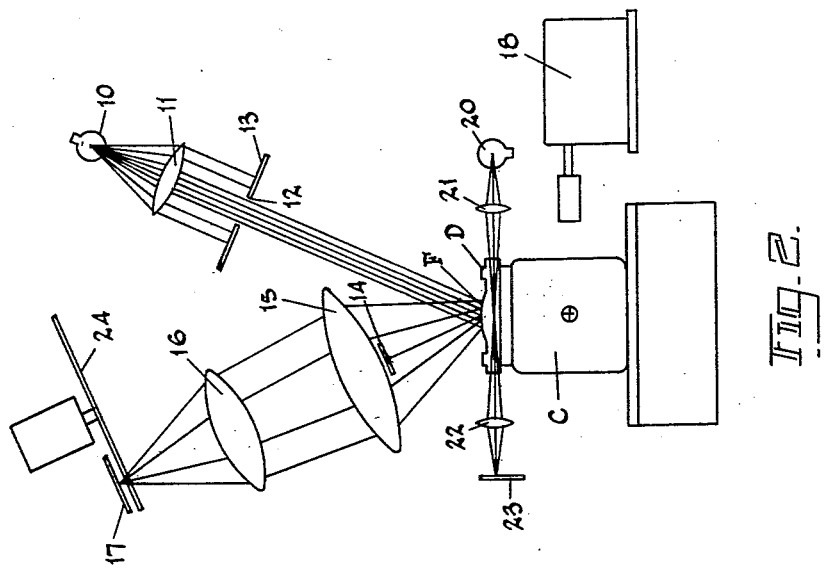
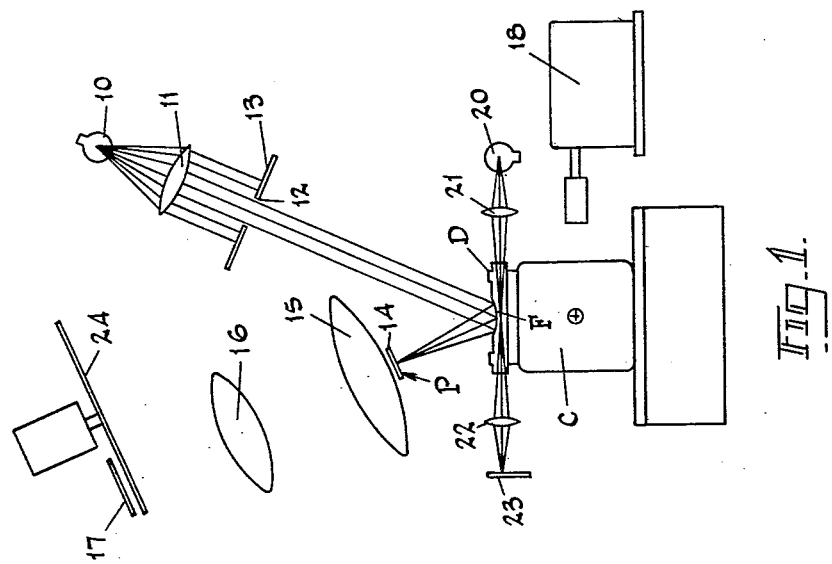
INVENTOR.
BENNY B. MATHIAS
BY
*W.A. Schaich*
*Charles S. Lynch*
ATTORNEYS May 5, 1964 B. B. MATHIAS 3,131,815
INSPECTING SEALED CONTAINERS FOR VACUUM
Filed Dec. 29, 1960 7 Sheets-Sheet 2

INVENTOR.
BENNY B. MATHIAS
BY W.A. Schaick &
Charles S. Lynch
ATTORNEYS

INVENTOR.
BENNY B. MATHIAS

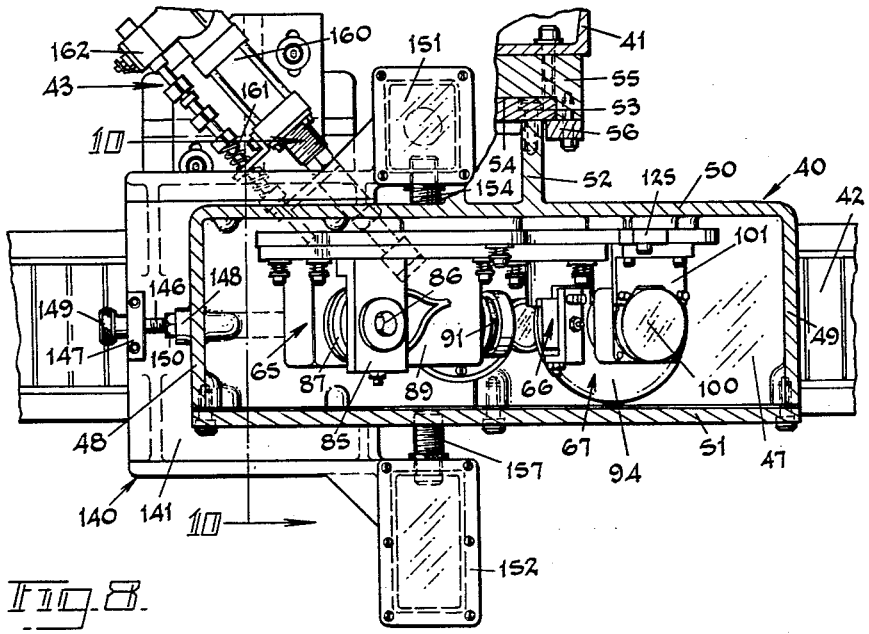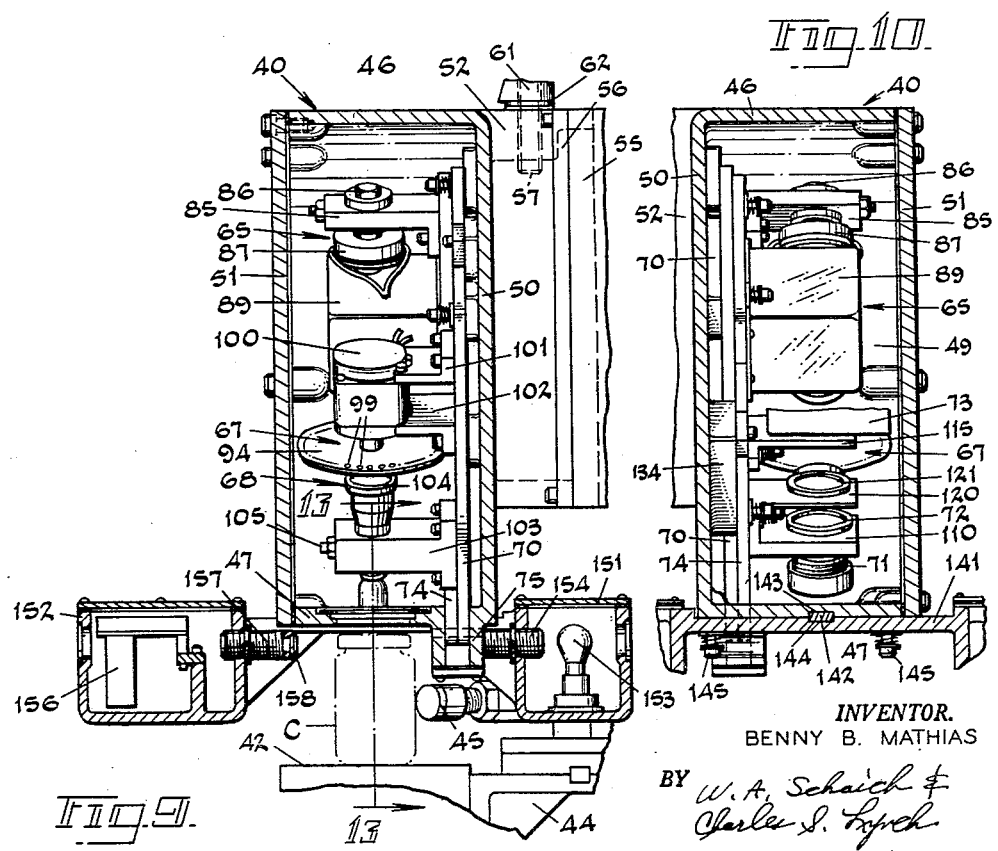

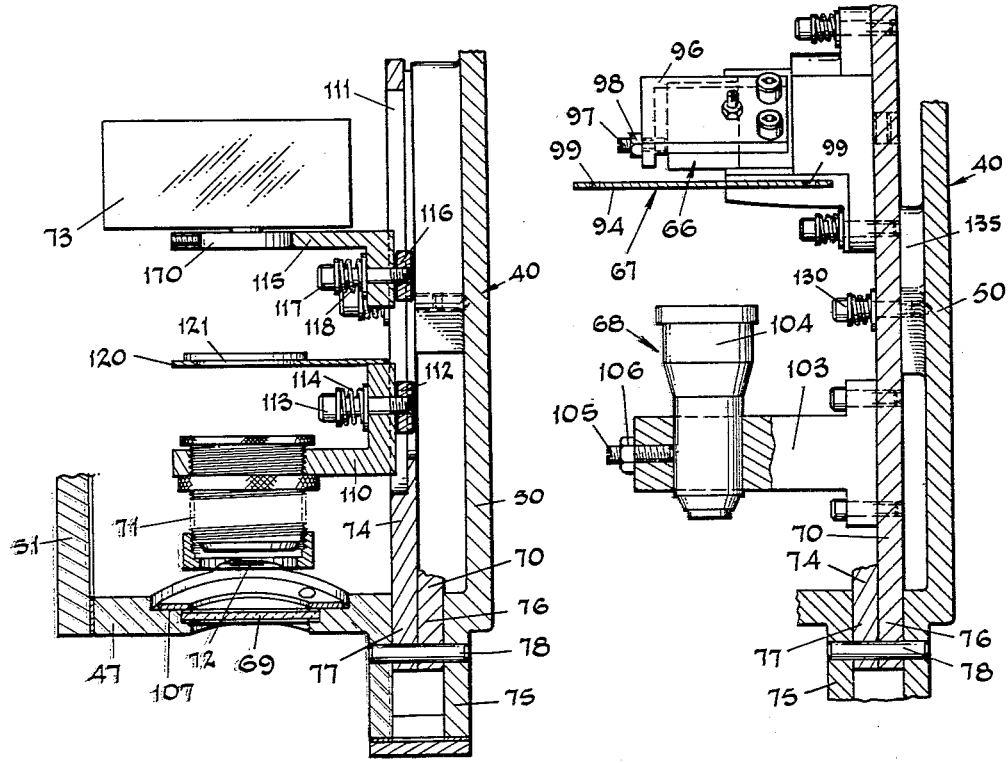
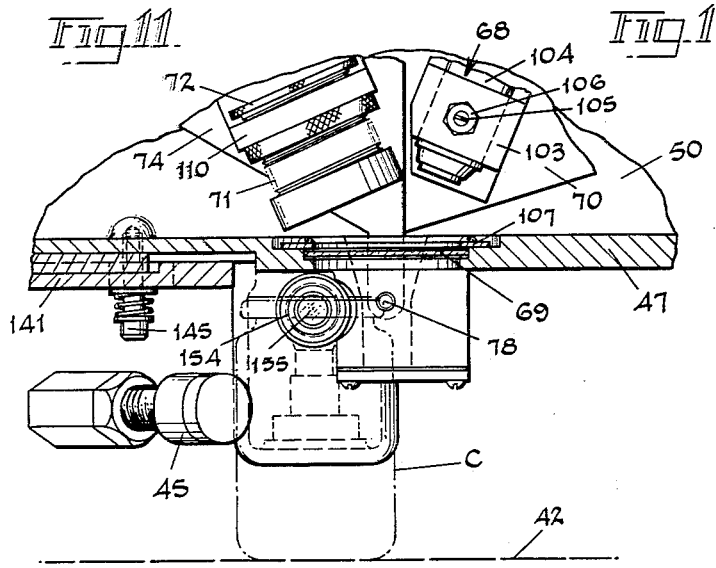

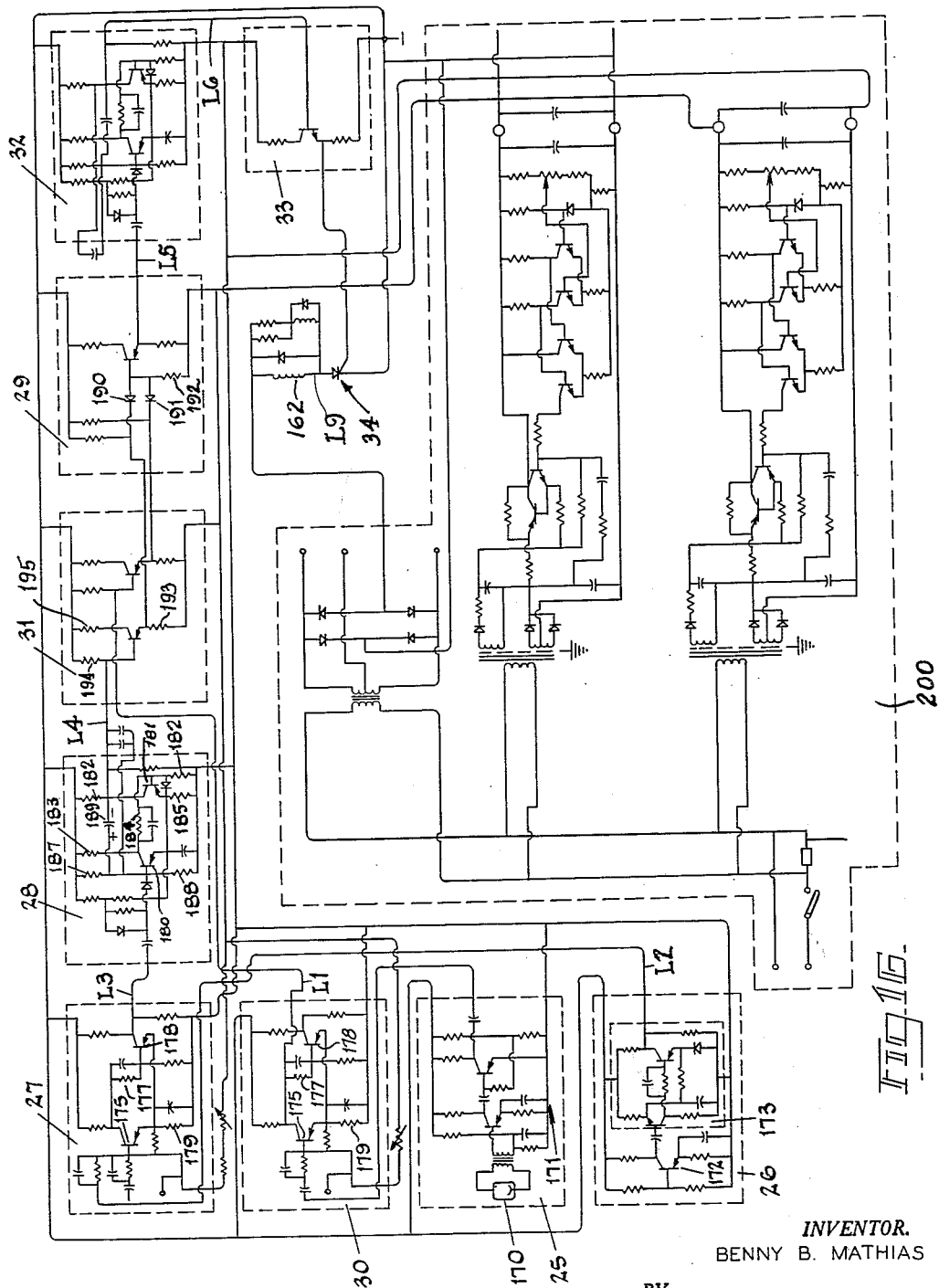

United States Patent Office 3,131,815
Patented May 5, 1964

3,131,815
INSPECTING SEALED CONTAINERS
FOR VACUUM
Benny B. Mathias, Toledo, Ohio, assignor to Owens-Illinois Glass Company, a corporation of Ohio
Filed Dec. 29, 1960, Ser. No. 85,442
23 Claims. (Cl. 209—111.5)

This invention relates to the inspection of sealed hollow containers to determine whether or not the vacuum in the containers is proper and particularly to the inspection of sealed hollow glass containers having metal caps which incorporate a flip panel that assumes a concave configuration when the vacuum in the container is satisfactory and a convex configuration when the vacuum in the container is unsatisfactory.

In order to insure proper preservation of certain goods such as foods, it is customary to pack such foods in sealed containers to prevent the entrance of external air which would cause deterioration of the foods. One manner of achieving a proper seal is to evacuate the head space which is present in the upper end of the container. Another method is to fill the head space with steam, seal the container so that when the contents of the container are cooled, the steam condenses forming a vacuum in the head space of the container. Whenever a vacuum is used, regardless of the manner in which it is achieved, it is essential to inspect the containers to make sure that the vacuum has not been inadvertently lost, for example, by misalignment of the cap or improper positioning of the gasket. Conventionally, such inspection can be achieved by tapping the containers, the containers having a proper vacuum giving off a different sound than those having an unsatisfactory vacuum. Obviously, such a procedure is slow and not too reliable.

It has also been heretofore recommended that a flip panel be incorporated in the closure or cap which assumes a concave configuration when the vacuum in the container is unsatisfactory, that is, falls below a predetermined value. Containers having caps with such flip panels can be visually inspected to determine the presence of containers having an improper vacuum. Such visual inspection is, of course, slow and difficult. Moreover, since the number of containers having an improper vacuum is usually small, normally less than one in 2500, there is a very good chance of missing such containers. Since present day packing lines run at very high speeds on the order of one thousand containers per minute, any visual inspection is entirely unsatisfactory.

It is therefore an object of this invention to provide a method and apparatus for inspecting sealed containers having a flip panel quickly and reliably.

It is a further object of the invention to provide a method and apparatus for inspecting such containers without stopping the containers and without contacting them.

It is a further object of the invention to provide such a method and apparatus for inspecting the containers wherein the chances of false rejection are substantially eliminated.

It is a further object of the invention to provide such an apparatus for inspecting containers which is operable only when the container is present at an inspection station and is therefore not subject to false actuation when a container is not present.

It is a further object of the invention to provide an apparatus for inspecting containers which is reliable, which will withstand the wet conditions, high temperature and high humidity inherent in its use in the area of a packing apparatus.

It is a further object of the invention to provide such an apparatus which can be quickly adjusted to accommodate containers of various heights and sizes.

Basically, the invention comprises directing a parallel beam of radiant energy downwardly onto the flip panel of the container, wherein the flip panel comprises a small part of the top area of the closure, and causing the beam to be reflected upwardly in accordance with the confiuration of the flip panel. When the flip panel is concave indicating a proper vacuum, the beam is focused on a mask positioned at the focal point. However, if the flip panel is convex indicating an unsatisfactory vacuum, then the beam passes beyond the periphery of the mask and is collected on a light sensitive element, which is adapted to energize a reject mechanism. The light sensitive element is conditioned for rejection by a second light beam which is directed across the path of the containers as they are continuously moved past the inspection station and a second light sensitive element in the path of the second beam. The interruption and passage of the second light beam to the second light sensitive element conditions the reject circuit associated with the first light sensitive element so that the container can be rejected.

An electronic pulse type apparatus is associated with the invention and includes an "and" gate which is conditioned by the second light sensitive element to permit the signal from the first light sensitive element to pass to the reject mechanism.

The entire beam producing and light sensing portions of the apparatus are enclosed in a sealed housing which will withstand the conditions of moisture, temperature and humidity which are inherently found in the area of a packing apparatus. The various elements are so assembled and mounted in the housing that the direction of the beam toward the flip panel can be adjusted by making one adjustment and the direction of the corresponding light sensitive element with respect to the flip panel can be adjusted by making another adjustment.

In the drawings:

FIGS. 1 and 2 are diagrammatic representations of the invention, FIG. 1 showing the operation on a container having a satisfactory vacuum and FIG. 2 showing the operation on a container having an unsatisfactory vacuum.

FIG. 8 is a sectional view, on an enlarged scale, taken along the line 8—8 in FIG. 3.

FIG. 9 is a sectional view, on an enlarged scale, taken along the line 9—9 in FIG. 3.

FIG. 10 is a sectional view taken along the line 10—10 in FIG. 8.

FIG. 11 is a sectional view taken along the line 11—11 in FIG. 6.

FIG. 12 is a sectional view taken along the line 12—12 in FIG. 6.

FIG. 13 is a fragmentary sectional view taken along the line 13—13 in FIG. 9.

FIG. 16 is a schematic wiring diagram of the electronic apparatus shown in FIG. 14.

Figure 3:
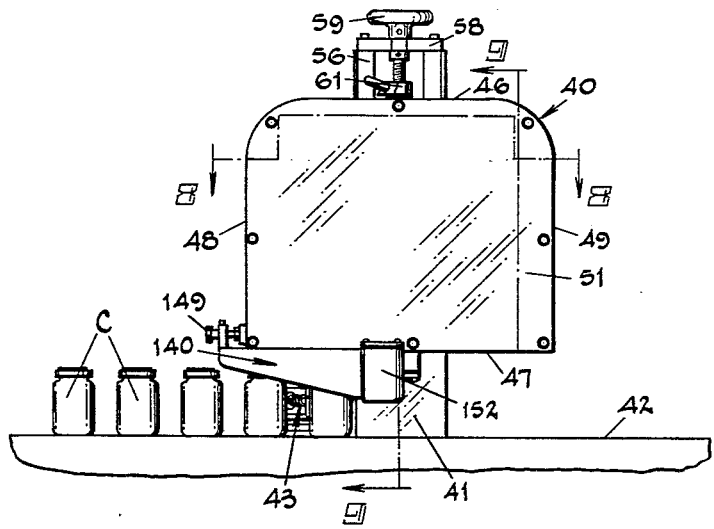
FIG. 3 is a fragmentary side elevation of an apparatus embodying the invention.

According to the invention, the inspection of containers is adapted to be performed as the containers are moved continuously past an inspection station. As shown in FIG. 1, the containers C are of a type, such as a glass container, having a cap D which has a panel F generally centrally thereof that assumes a concave configuration (FIG. 1) when the vacuum in the container is satisfactory and a non-concave or convex configuration (FIG. 2) when the vacuum in the container is unsatisfactory. Flip panel F forms a small part of the total area of the top of closure D.

According to the invention, the light from a light source 10 is focused into a parallel beam by a lens 11 and passes through the opening 12 of a plate 13, in the form of a parallel beam, downwardly at an angle onto the flip panel F. The beam is reflected by the panel F. When the vacuum in the container is satisfactory, as shown in FIG. 1, the flip panel F assumes a concave configuration and focuses the reflected beam at a focal point P at which a mask 14 is positioned. However, if the vacuum in the container C is unsatisfactory, as shown in FIG. 2, the flip panel F assumes a non-concave or convex configuration and reflects the beam not only on the mask 14 but, in addition, past the periphery of the mask. Collecting lenses 15, 16 collect the light that passes by the mask 14 and direct it onto a light sensitive element 17 that is sensitive to the radiation of the light source 10. If the light sensitive element 17 and its associated circuit are properly conditioned, a reject mechanism 18 is energized to push the container C off the conveyor.

The circuit of the light sensitive element 17 is conditioned so that the element will operate to reject the container only if the container is in proper position for inspection so that the light sensitive element will not be subject to energization by reflections other than those from the flip panel F. This is achieved by utilization of a second light source 20 which is adapted to direct a light beam through a lens 21 across and transversely of the path of the closure D of the container C past the inspection station. If no container is present, the beam from the light source 20 is focused by a lens 22 onto a second light sensitive element 23. The interruption and passage of the light beam from the second light source 20 to the second light sensitive element 23 conditions the reject circuit associated with the first light sensitive element 17 so that the container can be rejected. As presently described, the circuit associated with the second light sensitive element 23 is adapted to provide a pulse when the trailing edge of the closure D of the container permits passage of the light beam from the second light source 20 to the second light sensitive element 23.

The associated electronic apparatus is operable by pulses. In order to achieve such pulses in the light beam, a chopper disc 24 having a plurality of openings in the periphery thereof is provided in the path of the light beam or the reflected light beam to break the beams into short pulses of light. As shown, in FIGS. 1 and 2, chopper disc 24 is adjacent the light sensitive element 17.

Figure 14:
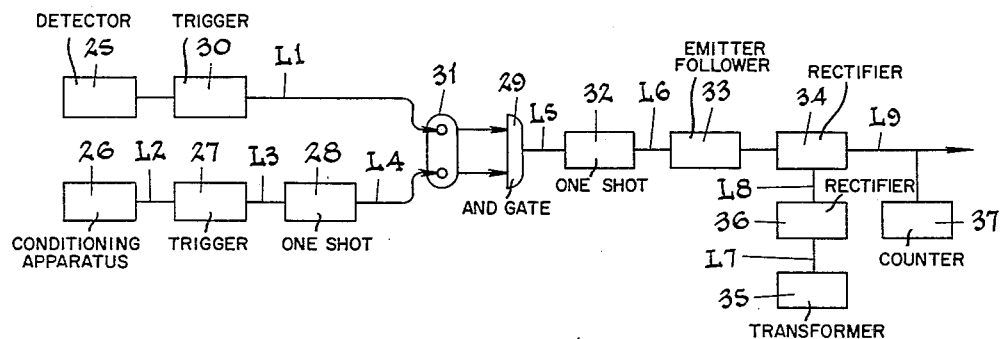
FIG. 14 is a schematic block diagram of the electronic apparatus utilized in the invention.

A block diagram of the basic electronic apparatus is shown in FIG. 14 wherein the light sensitive element 17 is associated with a detector 25 to produce an electronic pulse and the light sensitive element 23 is associated with a conditioning apparatus 26 to produce an electronic pulse. If a container is present at the inspecting station, a pulse from the conditioning apparatus 26 energizes trigger 27 which, in turn, actuates a one shot or monostable multivibrator 28 to condition an "and" gate 29 in "on" position. If, at the same time, the flip panel F of the container C is non-concave or convex as shown in FIG. 2, the passage of light to the light sensitive element 17 causes a pulse in the detector 25 which is shaped by trigger 30 and passes to the "and" gate 29 through emitter follower 31. In turn, the pulse passing through the "and" gate energizes a one shot or monostable multivibrator 32, emitter follower 33 and silicon controlled rectifier 34 which is provided with current from a transformer 35 and bridge rectifier 36. Rectifier 34 passes a reject pulse to energize a solenoid for operating the reject mechanism and also energizes a counter 37. The details of construction of the various elements of the electronic apparatus are conventional and are presently described.

*General Construction*

Figure 5:
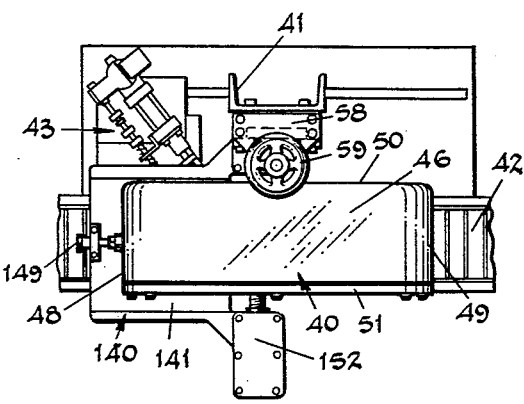
FIG. 5 is a fragmentary plan view of the apparatus shown in FIG. 3.
Figure 4:
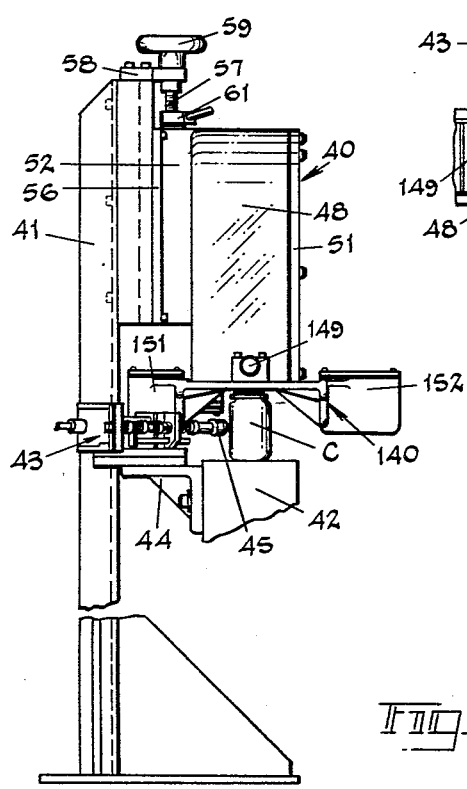
FIG. 4 is a fragmentary rear elevation of the apparatus shown in FIG. 3.

In practice, the apparatus is provided in a housing so that it is sealed from the conditions surrounding the packing apparatus and so that the various elements of the apparatus can be adjusted. As shown in FIGS. 3, 4 and 5, the apparatus comprises a housing 40 that is vertically adjustable on a support 41 fixed to the floor. The housing 40 overlies a conventional endless conveyor 42 that is adapted to move the containers C successively past the inspection station formed by the housing 40. A reject mechanism 43 is provided on the conveyor support 44 and includes a plunger 45 that is adapted to push the container C off the conveyor 42 in response to a signal from the reject mechanism.

Figure 6:
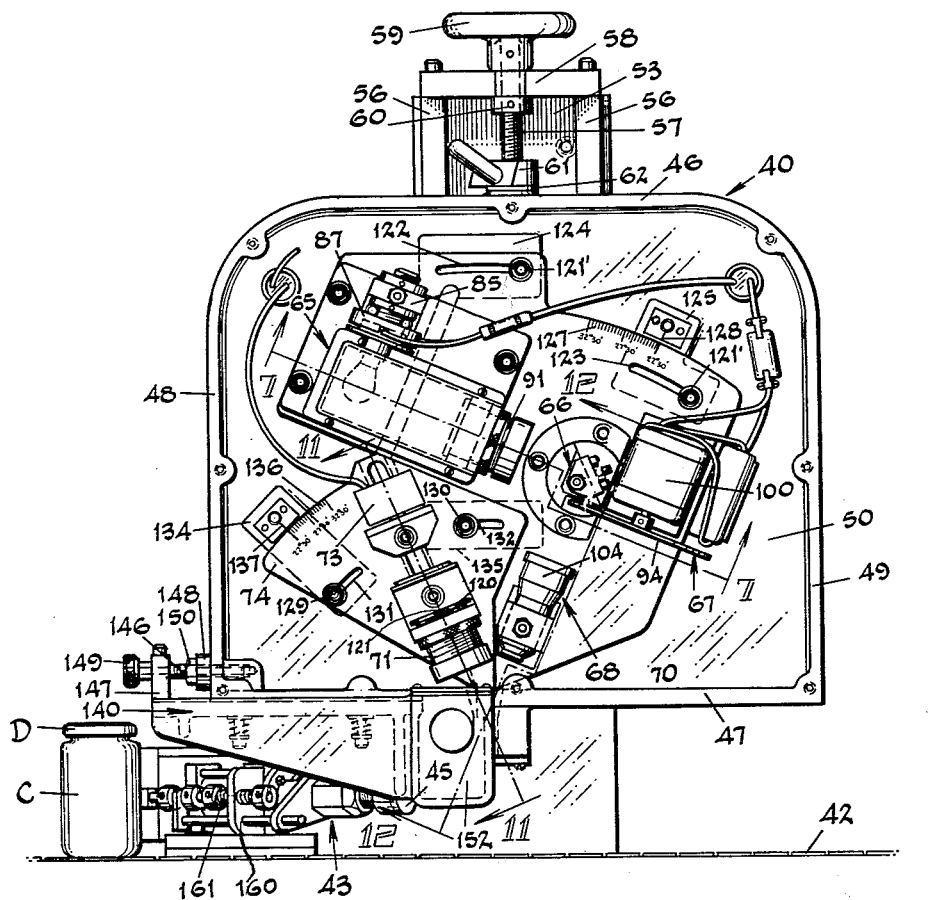
FIG. 6 is a side elevation of the apparatus shown in FIG. 3, on an enlarged scale, with a cover removed.

As shown in FIGS. 3, 4 and 5, housing 40 is generally rectangular and comprises a top wall 46, bottom wall 47, end walls 48, 49, side wall 50 and a removable cover or side wall 51. As shown in FIGS. 4, 5, 8 and 9, housing 40 includes an integral projection 52 on the outer surface of wall 50. A slide 53 is mounted on a projection 52 and slidably engages a slideway 54 formed in a block 55 which is fixed to the upright 41. Gibs 56 maintain the slide 53 in slideway 54 (FIGS. 6, 8 and 9). As shown in FIGS. 3, 4 and 6, a screw 57 is journalled in a plate 58 on the upper end of block 55 by a hand wheel 59 and a collar 60. The screw is threaded downwardly into the projection 52 so that rotation of the hand wheel will thread the screw 57 inwardly and outwardly relative to the projection 52 and, in turn, move the housing 40 up or down on the support 41. A lock nut 61 acts on a washer 62 to lock the screw in any adjusted position relative to the housing 40. In this manner, the position of the housing 40 relative to the conveyor 42 can be readily adjusted to accommodate containers of various heights.

Referring to FIG. 6, a light source 65 is mounted within housing 40 and directs a spot of light onto a prism 66 which reflects the spot onto a chopper 67. The chopper passes successive portions of the beam in the form of narrow beams onto a collimating lens 68 which, in turn, directs the successive beams downwardly through a transparent panel 69 (FIG. 13) in the bottom wall 47 of the housing. The light source 65, prism 66, chopper 67 and collimating lens 68 are mounted on a single plate 70 so that they may simultaneously angularly adjust, as presently described. Also mounted within the housing is a collecting lens 71, a mask 120 and a light sensitive element 73. Lens 71, mask 120 and light sensitive element 73 are mounted on a second plate 74 so that they can be simultaneously adjusted, as presently described. A mask 72, corresponding to mask 14 in FIGS. 1 and 2, is fastened to the face of lens 71 (FIG. 11).

Referring to FIG. 9, housing 40 includes a downwardly extending projection 75 formed by extensions of rear wall 50 and bottom wall 47. Plates 70, 75 include downwardly extending portions 76, 77 that are pivoted to a pin 78 in the projection 75 (FIGS. 11, 12). Plates 70, 74 thus can swing about the horizontal pin 78 to adjust the position of the elements mounted thereon relative to the window 69 and, in turn, the closure D of the container C movable below the window 69.

Figure 7:
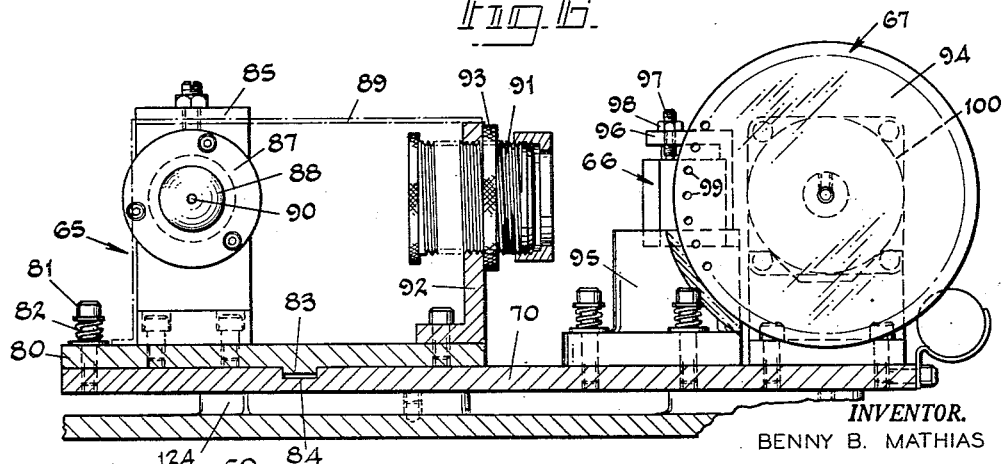
FIG. 7 is a fragmentary sectional view taken along the line 7—7 in FIG. 6.

Referring to FIGS. 6, 7, 8 and 10, light source 65 comprises a mounting plate 80 that is mounted on the first plate 70 by bolts 81. A positive locking is insured by coil springs 82 interposed between the heads of the bolts 81 and the mounting plate 80. In order to insure the accuracy of the position of the plate 80 on the plate 70, a projection 83 engages a slot 84 in the plate 70 (FIG. 7).

Light source 65 includes a bracket 85 bolted to the mounting plate 80 and a light socket holder 86 threaded in the bracket and supporting a light socket 87. Socket 87 supports a bulb 88 such as an incandescent bulb within an enclosure 89. The incandescent light bulb 88 includes a circular filament 90. A lens 91 is supported on a bracket 92 which is bolted to the mounting plate 80. Lens 91 is held in position by a lock nut 93. The image of the beam is focused by the lens 91 onto the plane of disc 94 of chopper mechanism 67 after being redirected by the prism 66. As shown in FIG. 7, prism 66 is mounted on a holder 95 that is bolted to the plate 70. The prism 66 is held on the holder by a retainer 96 which includes a portion overlying the prism and having a screw 97 threaded therein and adapted to engage the upper surface of the prism. A lock nut 98 holds the screw 97 in adjusted position. The prism is a right angle prism and changes the direction of the light from the lens 91 toward the disc 94.

The chopper disc 94 acts to break up the continuous beam of light into a plurality of discrete small beams. As shown in FIG. 7, the disc 94 includes a plurality of equally spaced circumferential openings 99 in the periphery thereof onto which the beam is focused. Disc 99 is mounted on the shaft of a motor 100 which, in turn, is fixed on brackets 101, 102 that are bolted to the plate 70 (FIG. 9).

The collimating lens apparatus 68 includes a mounting block 103 in which collimating lens 104 is adjustably mounted. A lock screw 105 is threaded into the block and engages the lens housing to lock the lens in adjusted position (FIG. 12). A lock nut 106 is threaded on the lock screw 105 to lock it in adjusted position.

As shown in FIGS. 11 and 13, the transparent plate 69 is held in position by a ring 107 acting in a countersunk portion of the inner surface of bottom wall 47 of housing 40. Suitable gaskets are provided along the periphery of the plate 69. Plate 69 is made of transparent glass or the like.

Referring to FIGS. 6 and 11, collecting lens 71 and mask 72 are mounted on a bracket 110 that is adjustably mounted in the slot 111 on plate 74. Bracket 110 is held in adjusted position in slot 111 by a T-nut 112 into which a bolt 113 extends, a coil spring 114 being interposed between the head of the bolt 113 and the bracket in the manner of previously described mounting bracket. Light sensitive element 73 is also mounted for movement relative to the plate 74 on a bracket 115 that is associated with slot 111 by a T-nut 116, bolt 117 and spring 118 in the same manner as bracket 110. A second mask 120 is mounted on the bracket 110 and is adapted to have a shaded central area 121 that cuts out reflections from the plate 69. The mask is at the focal point of such reflections.

As heretofore described, the plate 70, supporting the light source 65, prism 66 and collimating lens apparatus 68 is swingable about pin 78. In addition, the plate 74 supporting collimating lens 71, mask 72, mask 120, and light sensitive element 73 is also swingable about pin 78. Plates 70, 74 are locked in adjusted position. As shown in FIG. 6, plate 70 is locked in any adjusted position by bolts 121 which extend through slots 122, 123, which are curved about a radius having the pin 78 as its center, and extending into bosses 124, 125. Coil springs are interposed between the heads of the bolts 121 to insure a positive holding of the plate 70 in any adjusted position. It is preferred that degree markings 127 be provided on the plate 70 which, when associated with an indicator marking 128 on boss 125, facilitate the setting of the plate 70 in any particular angular position. In this manner, the direction of the beam downwardly onto the top surface of the container C can be adjusted with respect to a vertical axis.

The position of the plate 74 is similarly controlled by bolts 129, 130 extending through slots 131, 132 and slot 133 of plate 70 into bosses 134, 135 in the wall 50 of the housing. Degree markings 136 on the plate 74 can be used in connection with an indicator mark 137 to facilitate adjustment of the position of the plate 74. In this manner, the line of sight of the light sensitive elements, mask and collecting lens can be adjusted relative to the flip panel of the container C.

Housing 40 also supports the light source and light sensitive cell which condition the detecting apparatus when the container is in position for inspection. In this manner when the housing 40 is moved upwardly or downwardly, the conditioning apparatus is also moved upwardly and downwardly. Specifically, the conditioning apparatus 140 comprises a plate 141 that engages the underside of bottom wall 47 of housing 40 (FIG. 10). Plate 141 and, in turn, apparatus 140 is movable longitudinally relative to the housing 40 and is guided in its movement by a key 142 acting in slots 143, 144 in the bottom wall 47 and top surface of plate 141. Bolts 145 extend upwardly through slots in plate 141 to hold the plate 141 and, in turn, the mechanism 140 in position on the bottom wall. Accurate control of the longitudinal movement of plate 141 is achieved by a screw 146 that is journalled in a block 147 on the top surface of supporting plate 141 (FIGS. 6, 8) and is threaded into a boss 148 in the end wall 48 of housing 40. A knob 149 on screw 146 facilitates the rotation of the screw so that when the screw is rotated, it is threaded inwardly and outwardly in boss 148 to move the plate 141 longitudinally of the housing 40. A lock nut 150 may be threaded on the screw 147 in contact with the boss 148 to lock the plate 141 in adjusted position.

As shown in FIG. 8, plate 141 supports a pair of hollow housings 151, 152 on either side of the conveyor 42. Housing 151, in turn, supports a light source 153 in the form of an incandescent light bulb and includes a threaded tube 154 that supports a lens 155 for focusing a beam of light across the tops of the containers as the containers are moved successively beneath the housing 40 (FIG. 13). Housing 152 supports a light sensitive element 156 and includes a threaded tube 157 which has a lens 158 therein for collecting the light from the source 153 and focusing it on the light sensitive element 156. Tubes 154, 157 are aligned so that passage of light to the light sensitive element 156 is interrupted by the leading edge of the closure D of a container C and is re-established upon passage of the trailing edge of the closure D. As a row of containers moves successively beneath housing 40, passage of the light beam from the source 153 to element 156 is successively interrupted and re-established.

Reject mechanism 43 shown in FIGS. 4, 5, 6 and 8 comprises an air-operated cylinder 160 that is adapted to project the plunger 45 to eject a container from the conveyor 42. A spring return 161 is provided for the piston or plunger 45. The actuation of the air motor 160 is controlled by a solenoid operated valve 162. Air-operated, spring return motors of this type are commonly known in the art.

*Electronic Apparatus*

FIG. 16 is a circuit embodying the elements shown in block form in FIG. 14.

As shown in FIG. 16, the detector 25 comprises a cell 170 which is sensitive to the light. Cell 170 is preferably of the solar type such as is well known under the designation Hoffman S–1A. Cell 170 is transformer coupled and connected to a two-stage transistor amplifier 171.

Conditioning apparatus 26 comprises a photo-transistor 172 and a reset generator 173. The photo-transistor is connected in the manner of a class A audio amplifier. The reset generator is of a type which is well known in the art and, for example, is manufactured by Engineered Electronics Company, Santa Ana, California, under the designation T–109.

Referring to FIG. 16, triggers 27, 30 are commonly known as Schmitt triggers and shown in FIG. 16 as being transistorized. Their function is to convert the negative input pulses of variable amplitude to standard digits that shift from a more negative to a less negative voltage with each input pulse.

Referring, for example, to trigger 30, it comprises a transistor 175 which is cut off and a transistor 178 which is saturated. Transistor 175 is assured to be cut off because the two tranistors are emitter coupled by the resistor 179. The current flowing through the second transistor 178 causes a voltage drop through the resistor 179 which makes the emitter of the first transistor 175 negative with respect to its base. Thus, the transistor 175 is reversed biased. The second transistor 178 is forward biased from the collector load resistor of the first transistor 175 and the resistor connecting the load resistor and base of the second transistor 178. In its quiescent state, the first transistor 175 is cut off and the second transistor 178 is saturated. The little cut-off current in the first transistor 175 causes a small drop across its collector load resistor, clamping the output at a predetermined negative voltage.

When a negative pulse is applied, the first transistor 175 becomes forward biased and begins to conduct. At the same time, the voltage drop across its load resistor increases which reduces the forward bias on the second transistor 178 driving it toward cut off. As this happens the bias on the first transistor 175 is reduced. This regenerative action continues until the first transistor 175 is saturated and the second transistor 178 is cut off. When the input pulse is removed, the reverse bias is again applied to the first transistor 175 and the circuit will restore itself to its original condition. Triggers of the type described are manufactured by Engineered Electronics Company, Santa Ana, California, under the designation T–106.

One shots or monostable multivibrators 28, 32 are shown in FIG. 16. Their purpose is to receive a pulse of standard amplitude and convert it to a pulse of standard amplitude and standard width. Referring, for example, to one shot 28, it comprises transistors 180, 181.

Initially, transistor 180 is conducting and transistor 181 is cut off. The cut off for transistor 181 is provided by the voltage drop across the combination of resistors 183, 184 and 186. This causes a reverse bias on transistor 181 cutting it off. The cut-off current through resistor 182 clamps the output to a predetermined voltage. Transistor 181 is held in saturation by voltage divider 187 and 188 which forward biases transistor 181.

When a positive pulse is fed into transistor 180, it conducts less. As a result, the voltage drop decreases and transistor 181 becomes forward biased and begins to conduct. This action continues until transistor 180 is cut off and transistor 181 is conducting. Transistor 180 is held at cut off by capacitor 189, which has been charged as shown. The capacitor 189 charge holds transistor 181 at cut off. Capacitor 189, however, discharges exponentially through resistor 187. As soon as the reverse bias is removed from transistor 180 by the discharge of capacitor 189 it will begin to conduct, thus, cutting off transistor 181 and restoring the circuit to its original condition. The output pulse width is controlled by the time constant of resistor 187 and capacitor 189. One shots of the type described are manufactured by Engineered Electronics Company, Santa Ana, California under the designation T–105.

The "and" gate 29 as shown in FIG. 16 comprises two input "and" gates. The "and" gate will give an output pulse if input pulses are coincident on all of the inputs. If no pulse is present on any of the inputs, there will be no output pulse.

Both diodes 190, 191 are forward biased by the supply voltage and resistor chain. Current will flow through the diodes 190, 191 clamping the voltage across the resistor 192 at a given level. If a positive pulse appears on either input, that diode will be reversed biased and will not conduct. However, the other diode will continue to conduct and the voltage across the resistor 192 will remain clamped at its original valve. If both inputs receive a positive pulse simultaneously, both diodes will be reversed biased and the voltage drop across resistor 192 will rise, producing an output pulse. The output is fed to an emitter follower. An "and" gate of the type described is manufactured by Engineered Electronics Company, Santa Ana, California under the designation T–404.

The emitter followers 31, 33 are substantially transistorized cathode followers. Each such emitter follower comprises an input. When the input is at a predetermined negative voltage, the drop across the emitter resistor 193 is at the same voltage. When input is less negative, the transistor conducts less and the output jumps to the lesser voltage. The resistor 194 provides bias to the transistor. The resistor 195 helps establish D.C. level in the output. The output is at a lower impedance than the input. Emitter followers of the type described are manufactured by Engineered Electronics Company, Santa Ana, California under the designation T–112.

The power supply, designated with the reference numeral 200 in FIG. 16, is adapted to convert alternating current to pulsating direct current for use with the transistors of the various elements of the electronic apparatus. The power supply includes a rectifier section, a filter section and an electronic regulator. The particular power supply shown is commonly known as a Sorensen type QM 12–.16, but, of course, it should be understood that other power supplies may be used.

The lead lines L1 to L9 correspond to the lines connecting the elements in the block diagram shown in FIG. 14. These designations, in turn, correspond to the numbers of the wave forms shown in FIG. 15, as more fully described below.

*Operation*

With the power supply on, conveyor 42 continuously moves containers C successively beneath housing 40 at a high rate of speed on the order of 600 containers per minute and as high as a thousand containers per minute. As the containers move past the station, beams of light are continuously directed downwardly through the transparent plate 69 so that they can be intercepted by the closures D of the containers C. As the leading edge of a closure D interrupts the beam from the light source 153, the output of the cell 156 drops to zero. When the trailing edge of the closure D of that container C passes the light beam from the source 153, the light beam is permitted to again pass to the element 156 producing a pulse which places the gate 29 in "on" condition. If, at that moment, light is reflected upwardly from the flip panel F of the closure D past the periphery of the mask 72 and onto the light sensitive element 170, indicating a container with improper vacuum, the detector 25 is energized producing a series of pulses which are permitted to pass through the gate 29. These pulses energize one shot 32 producing a pulse of sufficient duration to, in turn, energize the solenoid 162 of the valve which controls the air operated reject motor 160.

Figure 15:
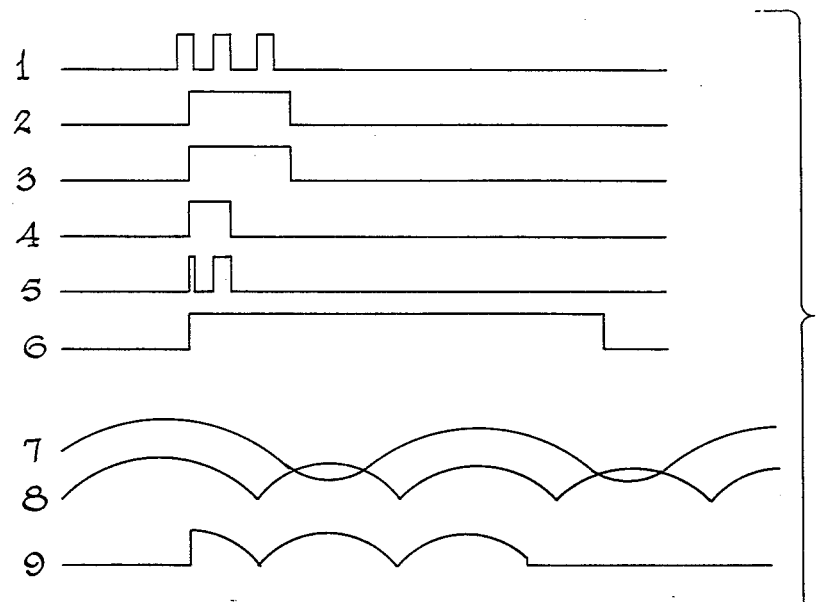
FIG. 15 is a diagram of the wave forms of the electronic apparatus.

The relationship of the pulses from the detector 25 and conditioning circuit 26 is shown in FIG. 15. A pulse produced by the re-establishment of the light beam upon passage of the trailing edge of the closure D past the light beam from the source 153 produces a pulse, shown as wave form 2, which is converted to a pulse of predetermined width, shown as wave form 4, causing the gate 29 to be set in "on" condition. If the pulses from the detector 25, shown as wave form 1, occur during the time interval that the gate 29 is "on," they are permitted to pass, shown as wave form 5, triggering one shot 32 to produce a pulse of sufficient duration, shown as wave form 6, to energize the solenoid 162.

It can thus be seen that the apparatus operates to quickly inspect containers having a flip panel without stopping the containers and without contacting them. The inspection occurs only when a container is present at an inspection station. This obviates the possibility of false rejections from reflections other than from the flip panel of the containers. The positioning of the chopper 67 in the path of the light beam, rather than adjacent the light sensitive element as shown in FIGS. 1 and 2, minimizes the danger of a false rejection from extraneous reflections. The conditioning of the reject current by the trailing edge of the closure provides sufficient clearance to permit rejection at the inspection station. The directing of the beam from source 153 on the closure rather than the container provides for a more reliable and distinct action than would occur if the beam were directed on the glass container.

In the apparatus described, any malfunction which may occur, such as a failure of power supply to the electronic apparatus, will permit the passage of the containers rather than reject all of the containers. Since the number of improperly sealed containers is very low in a normal operation, this is desirable to prevent a chaotic condition at the high speeds involved which would occur if all of the containers were rejected upon failure of the apparatus.

Since the entire inspection apparatus is sealed, it is not subject to being adversely affected by the wet conditions, high temperature and high humidity which are inherent in its use in the area of a packing apparatus.

It has been found that the apparatus which has been described results in an accurate and reliable sensing of containers which have an improper vacuum as well as containers which have crushed closures.

I claim:

1. The method of determining when the vacuum in a container falls below a predetermined level where the container includes a flip panel that assumes a concave configuration when the vacuum is satisfactory and a convex configuration when the vacuum is unsatisfactory, which method comprises moving containers continuously in succession past an inspection station, directing a first beam of radiant energy directly into the flip panel of a container as it reaches the inspection station, causing said first beam to be reflected by said flip panel upwardly into a predetermined area, causing a portion of said beam to bypass said area when the vacuum in the container is unsatisfactory as evidenced by a convex configuration of the flip panel, interrupting said bypassed portion of said first beam to create a plurality of pulses of radiant energy, directing a second beam of radiant energy in the path of said containers in said inspection station, causing each container to interrupt said second beam as it reaches the inspection station, creating a pulse of predetermined time interval in response to the interruption and re-establishment of the second beam and rejecting the container when the pulses created by interrupting the bypassed portion of the first beam occur during the time interval of the pulse created by interruption of the second beam.

2. In an apparatus for determining whether the vacuum in a sealed container is satisfactory where the container has a flip panel that assumes a generally concave configuration when the vacuum in the container is satisfactory and a non-concave configuration when the vacuum in the container is unsatisfactory, the combination comprising means for directing a parallel beam of radiant energy downwardly onto the flip panel of the container at such an angle that the beam is thereafter reflected away from the flip panel in accordance with the curvature of the flip panel, a mask positioned at the focal point of the beam reflected by a closure having a satisfactory vacuum as represented by a concave flip panel, a light sensitive element positioned in the general direction of the reflected beam behind the mask, a collecting lens between the light sensitive element and the mask and adapted to collect light passing beyond the periphery of the mask and direct it onto the light sensitive element, and means energized by said light sensitive element for indicating when the reflected light beam exceeds the periphery of the mask by a predetermined amount indicating that the flip panel has assumed a non-concave configuration and that the container should be rejected.

3. In an apparatus for determining whether the vacuum in a sealed container is satisfactory where the container has a flip panel that assumes a generally concave configuration when the vacuum in the container is satisfactory and a non-concave configuration when the vacuum in the container is unsatisfactory, the combination comprising means for moving the containers continuously in succession past an inspection station, means for directing a first beam of radiant energy onto the flip panel of the container at an angle such that the beam is reflected away from the flip panel in accordance with the curvature of the flip panel and is caused to be focused at a focal point when the flip panel is of satisfactory concave configuration representing a proper vacuum in the container, a mask positioned at said focal point, means for interrupting the reflected portion of the first beam which bypasses said predetermined area and thereby creating a plurality of pulses of radiant energy, means for directing a second beam of radiant energy so that it is interrupted by a closure when the first beam is striking the flip panel, means for creating a pulse of predetermined time interval when the second beam is re-established by the trailing edge of a closure, and means for creating a reject signal when the pulses created by the bypassed portion of the light beam occur within the time interval of the pulse created by re-establishment of the second beam.

4. In an apparatus for determining whether the vacuum in a sealed container is satisfactory where the container has a flip panel that assumes a generally concave configuration when the vacuum in the container is satisfactory and a non-concave configuration when the vacuum in the container is unsatisfactory, the combination comprising a light source, a chopper disc, said chopper disc having a plurality of circumferentially spaced openings in the periphery thereof, means for rotating said chopper disc about its axis, a prism positioned adjacent said light source, a lens interposed between said light source and said prism for focusing the light from said light source into a spot on said chopper disc, said chopper disc thereby directing a plurality of spots of lights through said apertures, means for collimating said narrow beams of light from said chopper disc and directing them successively onto the flip panel of a container which is to be inspected thereby causing said beams to be reflected away from the container by the flip panel, each said beam being reflected and focused at a focal point when the flip panel is satisfactory, a mask at said focal point, and a light sensitive element positioned beyond said mask and adapted to be energized when the light beam is reflected by a flip panel that is not concave and is thereby caused to pass beyond the periphery of the mask.

5. The combination set forth in claim 4 wherein said light source, prism, first focusing lens, chopper disc, and collimating lens are mounted on a single support whereby the position of said elements relative to said container can be simultaneously adjusted.

6. The combination set forth in claim 4 wherein said mask and said light sensitive element are mounted on a single support whereby the position of said mask and element may be simultaneously adjusted.

7. The combination set forth in claim 4 including a first support, said light sensitive element, focusing lens, prism, chopper disc, and collimating lens being mounted on said first support, said first support being pivoted for swinging movement about a point adjacent the container when the container is in inspecting position, a second support pivoted to said last mentioned point, said mask and said light sensitive element being mounted on said second support.

8. The combination set forth in claim 7 wherein said light sensitive element and said mask are adjustable along a radial line on said second support.

9. The combination set forth in claim 7 including a housing enclosing said elements, said housing having a transparent panel in the wall thereof through which the beam is passed downwardly onto the container and through which the reflected beam is passed upwardly to the mask and light sensitive element.

10. In an apparatus for determining whether the vacuum in a sealed container is satisfactory where the container has a flip panel that assumes a generally concave configuration when the vacuum in the container is satisfactory and a non-concave configuration when the vacuum in the container is unsatisfactory, the combination comprising means for moving the container continuously in succession past an inspection station, means for directing a beam of light onto the flip panel of the container at an angle such that the beam is reflected away from the flip panel in accordance with the curvature of the flip panel and is caused to be focused at a focal point when the flip panel is of satisfactory concave configuration representing a proper vacuum in the container, a mask positioned at said focal point, means energized by the passage of a portion of the reflected light beam beyond the periphery of said mask when the light beam is reflected by a non-concave flip-panel to create a plurality of pulses, means responsive to the presence of a container at said inspection station for creating a pulse of predetermined time interval, and means for creating a reject signal when said plurality of pulses occur during said pulse of predetermined time interval.

11. In an apparatus for determining whether the vacuum in a sealed container is satisfactory where the container has a flip panel that assumes a generally concave configuration when the vacuum in the container is satisfactory and a non-concave configuration when the vacuum in the container is unsatisfactory, the combination comprising a sealed housing, means for supporting a container which is to be inspected beneath said housing, said housing having a transparent panel overlying the position of said container, means positioned within said housing for directing a beam of light downwardly through the transparent panel onto the flip panel of the container at an angle such that the beam is reflected upwardly through the transparent panel and back into the housing, a mask positioned in the housing in the path of the reflected light beam, said mask being at the focal point of the beam when it is reflected by a flip panel having a concave configuration indicating that the vacuum in the container is satisfactory, and an element sensitive to the radiant energy of the light beam positioned behind the mask within the housing and adapted to be energized when the light beam is dispersed beyond the periphery of the mask by a flip panel having a non-concave configuration representing that the vacuum in the container is unsatisfactory, and a chopper disc having a plurality of circumferentially spaced openings therein positioned within the housing in the path of the light beam between the source and the light senstive element.

12. The method of determining when the vacuum in a container falls below a predetermined level where the container includes a flip panel that assumes a concave configuration when the vacuum is satisfactory and a convex configuration when the vacuum is unsatisfactory, which method comprises directing a beam of radiant energy at an angle onto said flip panel, causing said beam to be reflected by said flip panel onto a predetermined opaque area, positioning an element sensitive to the radiant energy of the beam in the direction of the reflected beam and beyond said predetermined area such that said opaque area obstructs passage of a reflected beam from a flip panel of a container having a satisfactory vacuum to said sensitive element, and collecting and directing the portion of the reflected beam which passes beyond the periphery of the predetermined opaque area to the sensitive element and causing said element to thereby create a signal.

13. The combination set forth in claim 2 including means for moving the containers continuously in succession past said means for directing the beam of radiant energy, means for directing a second beam of radiant energy in the path of the containers so that it is interrupted by a closure when the first beam is striking the flip panel, a light sensitive element adapted to be energized by said second light beam when a container is not present, and means actuated by said second light sensitive element for conditioning the first light sensitive element when the passage of the second light beam to the second light sensitive element is re-established by the trailing edge of the closure.

14. The combination set forth in claim 13 wherein said means actuated by said second light sensitive element for conditioning said first light sensitive element includes electronic means comprising an "and" gate, said "and" gate being conditioned by a pulse from said second light sensitive element to permit passage of a pulse from the first light sensitive element through the "and" gate to the means for rejecting the container.

15. The combination set forth in claim 14 wherein said means actuated by said second light sensitive element for conditioning said first light sensitive element includes a Schmitt trigger and a monostable vibrator.

16. The combination set forth in claim 14 wherein said means for rejecting the container includes a silicon controlled rectifier to which the pulse from the first light sensitive element passes.

17. The combination set forth in claim 2 including a sealed housing, means for supporting a container to be inspected beneath said housing, said housing having a transparent panel overlying the position of said container, said means for directing said beam, said mask, said light sensitive element, and said collecting lens being mounted within said housing, said means for directing said beam being positioned for directing said beam downwardly through the transparent panel onto the flip panel of the container.

18. The combination set forth in claim 17 including means for angularly adjusting the direction of the light beam onto the container.

19. The combination set forth in claim 17 including means for angularly adjusting the position of the light sensitive cell relative to the container being inspected.

20. The combination set forth in claim 17 including means for angularly adjusting the position of the mask relative to the container being inspected.

21. The combination set forth in claim 17 including means within said housing for forming said beam into a parallel beam prior to its being directed through the transparent panel onto the container.

22. The combination set forth in claim 17 including a collecting lens interposed between the transparent panel and the light sensitive element and adapted to collect the light.

23. The combination set forth in claim 17 including a second housing mounted on said first housing and enclosing a second source of light, said second housing having an opening therein whereby said second source of light may be directed transversely of the first housing into the path of a container moving into position beneath the transparent panel, a third housing on said container positioned opposite said second housing and having an opening therein, a light sensitive element positioned adjacent said opening in said third housing and adapted to be energized by the beam from said second source whereby the passage of the beam from the second source to the second light sensitive element is interrupted when a container is present beneath the transparent panel of the first housing.

References Cited in the file of this patent
UNITED STATES PATENTS
2,524,929    Razek _____ Oct. 10, 1950